US012578594B2

(12) United States Patent
Miyazaki

(10) Patent No.: US 12,578,594 B2
(45) Date of Patent: Mar. 17, 2026

(54) METHOD FOR MANUFACTURING ELECTRONIC LIGHT-MODULATING DEVICE, LIGHT-MODULATING ELECTRONIC ELEMENT, AND ELECTRONIC LIGHT-MODULATING GLASSES

(71) Applicant: HOYA LENS THAILAND LTD., Pathumthani (TH)

(72) Inventor: Shigeki Miyazaki, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 348 days.

(21) Appl. No.: 18/032,956

(22) PCT Filed: Oct. 19, 2021

(86) PCT No.: PCT/JP2021/038550
§ 371 (c)(1),
(2) Date: Apr. 20, 2023

(87) PCT Pub. No.: WO2022/085666
PCT Pub. Date: Apr. 28, 2022

(65) Prior Publication Data
US 2024/0019716 A1 Jan. 18, 2024

(30) Foreign Application Priority Data
Oct. 20, 2020 (JP) ................................. 2020-175961

(51) Int. Cl.
G02F 1/155 (2006.01)
G02C 7/10 (2006.01)
G02F 1/157 (2006.01)

(52) U.S. Cl.
CPC ............. G02C 7/101 (2013.01); G02F 1/155 (2013.01); G02F 1/157 (2013.01); *G02C 2202/16* (2013.01)

(58) Field of Classification Search
CPC ..... G02C 7/101; G02C 2202/16; G02F 1/155; G02F 1/157; G02F 2201/56; G02F 1/163; G02F 1/1533
(Continued)

(56) References Cited

U.S. PATENT DOCUMENTS 8,096,653 B2 1/2012 Matsui
11,221,533 B2 1/2022 Takeuchi et al.
(Continued)

FOREIGN PATENT DOCUMENTS

CN 105143970 A 12/2015
JP 2014-106265 A 6/2014
(Continued)

OTHER PUBLICATIONS

Sep. 9, 2024 Extended European Search Report issued in European Patent Application No. 21882807.7.
(Continued)

*Primary Examiner* — Tuyen Tra
(74) *Attorney, Agent, or Firm* — OLIFF PLC

(57) ABSTRACT

A method for manufacturing an electronic light-modulating device that obtains a light-modulating effect by supplying electrical energy to an electronic element overlapping an optical element includes: forming a laminate in which a pair of electrode layers and a light-modulating layer between the pair of electrode layers are laminated; and setting, in the laminate, an overlapping region having a shape overlapping the optical element in a formation region of the light-modulating layer, setting two or more terminal regions which are continuous to an outer side of the overlapping (Continued)

region and in which one and the other of the pair of electrode layers are independently present, and cutting a portion including the overlapping region and the terminal regions from the laminate to form the electronic element. As a result, production efficiency is improved.

10 Claims, 8 Drawing Sheets

(58) Field of Classification Search
USPC ..................................................... 351/41, 158
See application file for complete search history.

(56) References Cited

U.S. PATENT DOCUMENTS

| | | |
|---|---|---|
| 2015/0298278 A1 | 10/2015 | Suzue et al. |
| 2015/0362818 A1 | 12/2015 | Greer |
| 2016/0033841 A1 | 2/2016 | Gauthier et al. |
| 2018/0299740 A1 | 10/2018 | Takeuchi et al. |
| 2020/0301226 A1 | 9/2020 | Yashiro et al. |
| 2020/0301227 A1 | 9/2020 | Takahashi et al. |

FOREIGN PATENT DOCUMENTS

| | | |
|---|---|---|
| JP | 5511997 B2 | 6/2014 |
| JP | 2016-509264 A | 3/2016 |
| JP | 2016-148805 A | 8/2016 |
| JP | 2017-526949 A | 9/2017 |
| JP | 6624206 B2 | 12/2019 |
| KR | 10-2015-0127658 A | 11/2015 |
| WO | 2017/104466 A1 | 6/2017 |

OTHER PUBLICATIONS

Dec. 28, 2021 Written Opinion of the International Searching Authority issued in International Patent Application No. PCT/JP2021/038550.
May 28, 2024 Office Action issued in Japanese Patent Application No. 2022-557548.
Oct. 8, 2024 Office Action issued in Korean Patent Application No. 10-2023-7017161.
Dec. 28, 2021 Search Report issued in International Patent Application No. PCT/JP2021/038550.
May 16, 2025 Office Action issued in Chinese Patent Application No. 202111219662.4.
Sep. 9, 2025 Office Action issued in Japanese Patent Application No. 2024-173952.

METHOD FOR MANUFACTURING ELECTRONIC LIGHT-MODULATING DEVICE, LIGHT-MODULATING ELECTRONIC ELEMENT, AND ELECTRONIC LIGHT-MODULATING GLASSES

TECHNICAL FIELD

The present invention relates to a method for manufacturing an electronic light-modulating device, a light-modulating electronic element, and electronic light-modulating glasses.

BACKGROUND ART

An electronic light-modulating device is known in which an electronic element is superimposed on an optical element and a light-modulating effect is obtained when electrical energy is supplied to the electronic element. As one example, electronic light-modulating glasses are known, which include an electronic element on or inside the eyeglass lens and change optical characteristics (light transmittance, color, and the like) according to changes in the state of the electronic element. Electrochromic elements (EC elements), liquid crystal elements, and the like are known as electronic elements used in this type of electronic light-modulating glasses.

An electrochromic element utilizes a phenomenon (electrochromism) in which reversible optical absorption occurs due to an electrochemical oxidation-reduction reaction or the like when a charge is applied to a substance. An electrochromic element used in an electronic light-modulating device generally has a laminated structure in which a pair of electrode layers for a positive electrode and a negative electrode and a light-modulating layer made of a material exhibiting electrochromism between the electrode layers are arranged.

CITATION LIST

Patent Literature

[PTL 1] Japanese Patent No. 5511997
[PTL 2] Japanese Patent No. 6624206

SUMMARY OF INVENTION

Technical Problem

Conventionally, when an electronic element such as an electrochromic element is to be assembled into an eyeglass lens, it has been necessary to prepare a mask that matches the outer shape of the lens and use this mask to pattern deposition areas for electrodes. For example, in the case of an electrochromic element, a mask pattern is generally formed so that a light-modulating region (active area) that changes color when a voltage is applied is formed in a central portion of the lens, and terminal electrodes divided into two as positive and negative electrodes are formed on the outer edge of the lens.

By the way, the shape of eyeglass lenses varies according to user's preference and frame design. In order to obtain an electronic element corresponding to this, it is necessary to prepare deposition masks individually for lenses having different shapes, and to change the deposition patterns for electrodes and the like. However, it takes a lot of money and time to produce deposition masks. The production efficiency is low if the deposition is performed by switching masks for lenses having different shapes. Conversely, if the deposition pattern of an electronic element is set first, the degree of freedom in selecting the lens shape is hindered.

Therefore, in the production of electronic light-modulating glasses, it is desired to improve productivity by using electronic elements that can easily adapt to a wide variety of lens shapes. This problem is particularly noticeable in electronic light-modulating glasses, which have many options for lens shape. In addition to electronic light-modulating glasses, electronic light-modulating devices that require customization of electronic elements in accordance with the shape and size of optical elements have the same problem. Electronic light-modulating devices using electronic elements other than electrochromic elements also have the same problem.

An object of the present invention is to provide a method for manufacturing an electronic light-modulating device, a light-modulating electronic element, and electronic light-modulating glasses, which are excellent in production efficiency so that the above-mentioned problems can be solved.

Solution to Problem

The present invention provides a method for manufacturing an electronic light-modulating device that obtains a light-modulating effect by supplying electrical energy to an electronic element overlapping an optical element, the method comprising: forming a laminate in which a pair of electrode layers and a light-modulating layer between the pair of electrode layers are laminated; and setting, in the laminate, an overlapping region having a shape overlapping the optical element in a formation region of the light-modulating layer, setting two or more terminal regions which are continuous to an outer side of the overlapping region and in which one and the other of the pair of electrode layers are independently present, and cutting a portion including the overlapping region and the terminal regions from the laminate to form the electronic element.

More specifically, the light-modulating layer in the laminate is substantially circular, each of the pair of electrode layers in the laminate has a circular portion, which is substantially circular, that overlaps the light-modulating layer, and an outer-diameter portion that is arranged radially outside the circular portion, and the laminate is formed in such a manner that the outer-diameter portions of the pair of electrode layers do not overlap each other in a front view. Then, the overlapping region is set so that an outer shape of the optical element inscribes a substantially circular outer peripheral shape of the light-modulating layer at two locations, and the terminal region is set so that the outer-diameter portions of one and the other of the pair of electrode layers are located on an outer side of the two inscribed locations.

Preferably, the circular portion of each of the pair of electrode layers in the laminate has a smaller diameter than the light-modulating layer.

Preferably, each of the outer-diameter portions of the pair of electrode layers in the laminate is a portion of a circular shape having a larger diameter than the circular portion, and the outer-diameter portion of one electrode layer and the outer-diameter portion of the other electrode layer are arranged symmetrically with respect to a center of the circular portion in a front view.

For example, the electronic element may be an electrochromic element that causes a reversible change in optical properties due to an oxidation-reduction reaction in the light-modulating layer when a voltage is applied to the electrode layer.

The present invention is particularly suitable as a method for manufacturing electronic light-modulating glasses in which the electronic element is arranged on or inside a lens which is the optical element.

The present invention provides a light-modulating electronic element that is arranged to overlap an optical element and obtains a light-modulating effect with supply of electrical energy, the light-modulating electronic element comprising: a laminate in which a pair of electrode layers and a light-modulating layer between the pair of electrode layers are laminated, wherein the laminate includes: an overlapping region, which is a region positioned within a formation region of the light-modulating layer and overlapping the optical element in a front view; and two or more terminal regions which are continuous to an outer side of the overlapping region and in which one and the other of the pair of electrode layers are independently present, and the laminate has a shape in which the overlapping region and the terminal region can be set for a plurality of optical elements having different shapes.

More specifically, the light-modulating layer in the laminate has a substantially circular shape in which an outer shape of the optical element inscribes an outer periphery at two locations, each of the pair of electrode layers in the laminate has a circular portion, which is substantially circular, that overlaps the light-modulating layer, and an outer-diameter portion that is arranged radially outside the circular portion, and the outer-diameter portions of the pair of electrode layers do not overlap each other in a front view. The terminal region is positioned on the pair of electrode layers outside the two locations where the outer shape of the optical element inscribes the outer periphery of the light-modulating layer.

The light-modulating electronic device described above is particularly useful for electronic light-modulating glasses. That is, the optical element is a lens, and the light-modulating electronic element has an overlapping region having a shape corresponding to this lens, and two or more terminal regions outside the overlapping region. Then, the electronic light-modulating glasses includes the light-modulating lens in which the light-modulating electronic element is located on or inside the lens, and the frame that holds the light-modulating lens.

Advantageous Effects of Invention

According to the method for manufacturing the electronic light-modulating device of the present invention, it is possible to easily obtain, from one type of laminate, electronic elements with electrodes corresponding to optical elements of various shapes. Thus, the production efficiency of electronic light-modulating devices such as electronic light-modulating glasses and light-modulating electronic elements can be remarkably improved.

DESCRIPTION OF EMBODIMENTS

Figure 1:
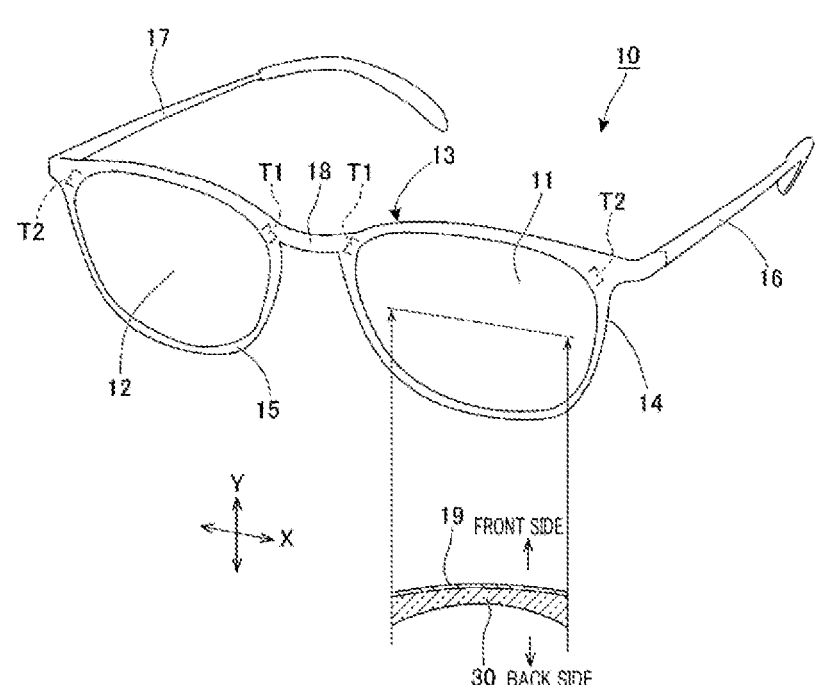
FIG. 1 is a diagram showing electronic light-modulating glasses, which is one form of an electronic light-modulating device.

FIG. 1 shows electronic light-modulating glasses 10, which is one form of an electronic light-modulating device to which the present invention is applied. The electronic light-modulating glasses 10 have left and right light-modulating lenses 11 and 12 and a frame 13. The frame 13 has left and right annular rims 14 and 15 holding the light-modulating lenses 11 and 12, temples 16 and 17 extending from the rims 14 and 15, and a bridge 18 connecting the rims 14 and 15. The left-right direction of the electronic light-modulating glasses 10 is defined as the X-axis direction, and the top-bottom direction is defined as the Y-axis direction.

As shown in a cross-sectional view in FIG. 1, the light-modulating lenses 11 and 12 are electronic light-modulating lenses in which an electrochromic element (EC element) 19, which is a light-modulating electronic element, is superimposed on the surface of a lens 30, which is an optical element. The lens 30 has a convex surface on the front side and a concave surface on the back side, and a sheet-like electrochromic element 19 is curved along the convex surface of the lens 30. By processing the shape of the concave surface of the lens 30, the power and the like can be adjusted. Although omitted in FIG. 1, a coating layer having a predetermined function (such as UV or infrared transmission control, lens protection effect, and the like) may be formed on the surface side of the electrochromic element 19.

As a method for manufacturing the light-modulating lenses 11 and 12, for example, the lens 30 and the electrochromic element 19 may be manufactured separately, the electrochromic element 19 may be preformed into a curved shape corresponding to the surface of the lens 30, and then the electrochromic element 19 and the lens 30 may be pasted together. Alternatively, the light-modulating lenses 11 and 12 may be obtained by integrally molding the electrochromic element 19 when molding the lens 30.

The electrochromic element 19 contains an electrochromic material that reversibly changes optical properties by an oxidation-reduction reaction when a voltage is applied. The electrochromic element 19 is transparent (highest transmittance of visible light) in a normal state where no voltage is applied. The electrochromic element 19 is colored in a predetermined color corresponding to the electrochromic material when a voltage is applied to lower the light transmittance. The configuration of the electrochromic element 19 will be described later.

The frame 13 is provided with a power supply, a control unit, and an operation unit (not shown). A conductive portion for supplying power to the electrochromic element 19 of the light-modulating lenses 11 and 12 is provided inside the frame 13, and the conductive portion is connected to terminal regions T1 and T2 of the electrochromic element 19. When the user operates the operation unit, the control unit controls the energization of the electrochromic element 19, and the light-modulating effect of the light-modulating lenses 11 and 12 is obtained. The control unit may change the light-modulating effect (light transmittance) of the light-modulating lenses 11 and 12 in a plurality of stages according to the operation of the operation unit.

By the way, in the electronic light-modulating glasses 10, the light-modulating lenses 11 and 12 of various shapes can be selected based on the user's preference and the design of the frame 13. A manufacturing method for efficiently producing the electrochromic elements 19 corresponding to the light-modulating lenses 11 and 12 having different shapes will be described below.

Figure 2:
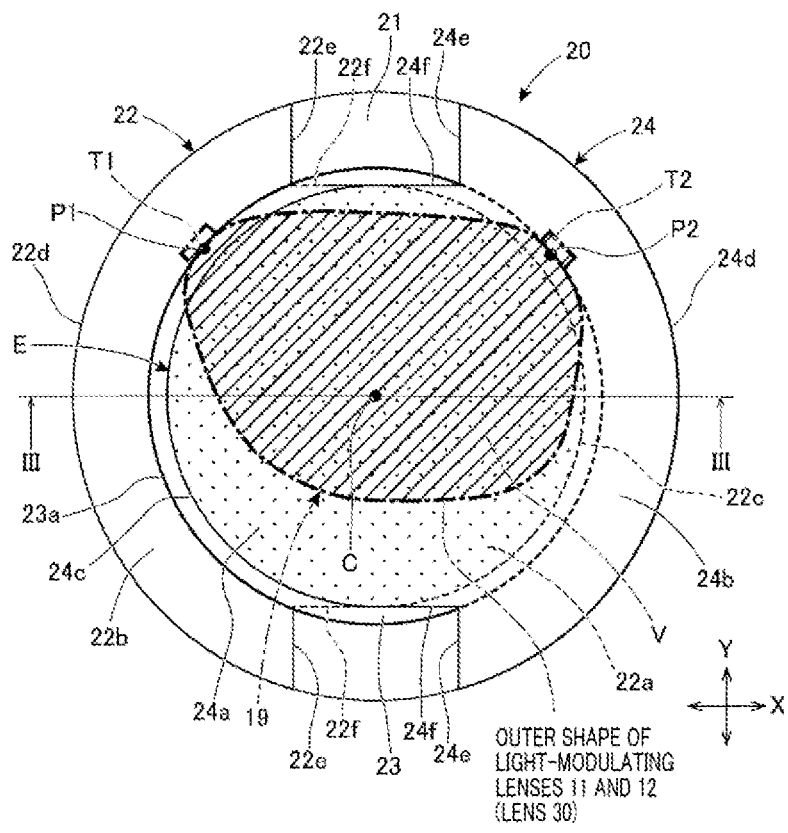
FIG. 2 is a front view of an electrochromic laminate that is a base of an electrochromic element that constitutes electronic light-modulating glasses.
Figure 3:
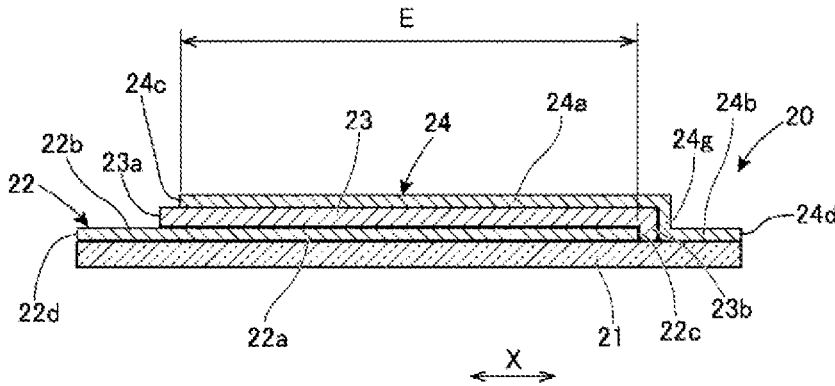
FIG. 3 is a cross-sectional view taken along line in FIG. 2.
Figure 4:
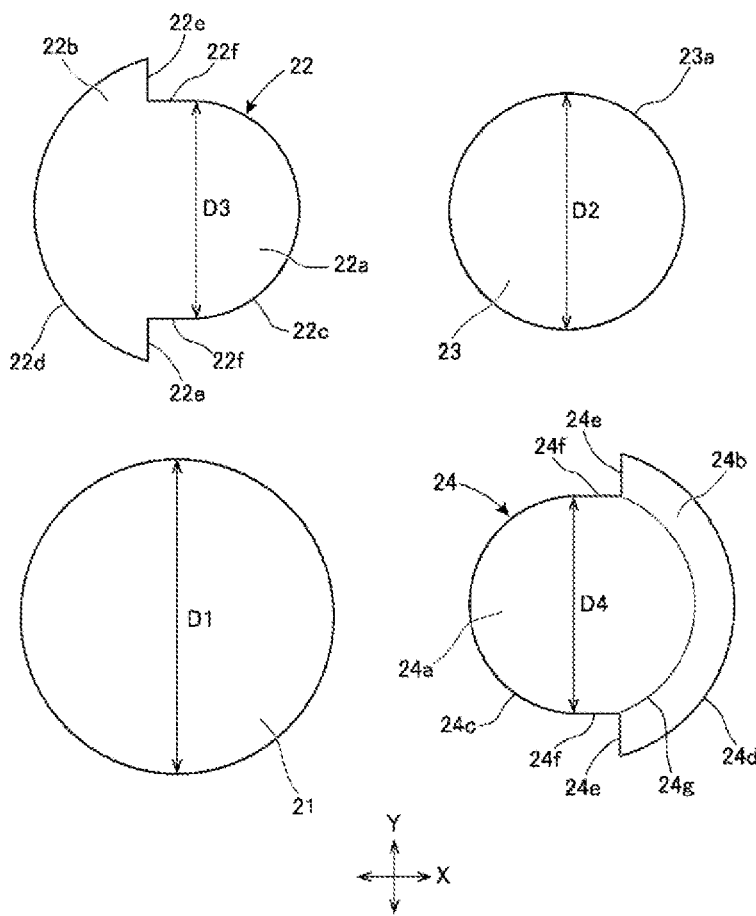
FIG. 4 is a front view showing each layer of the electrochromic laminate separately.
Figure 5:
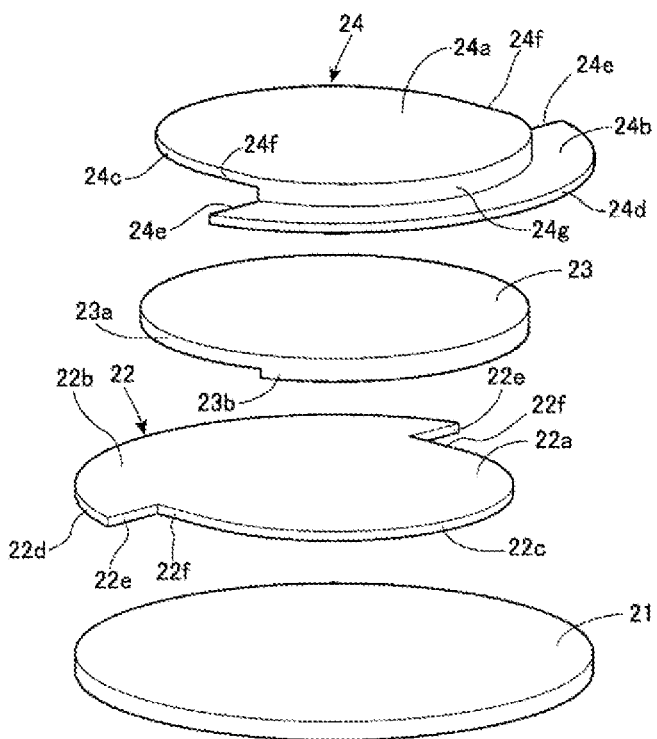
FIG. 5 is a perspective view showing each layer of the electrochromic laminate separately.
Figure 6:
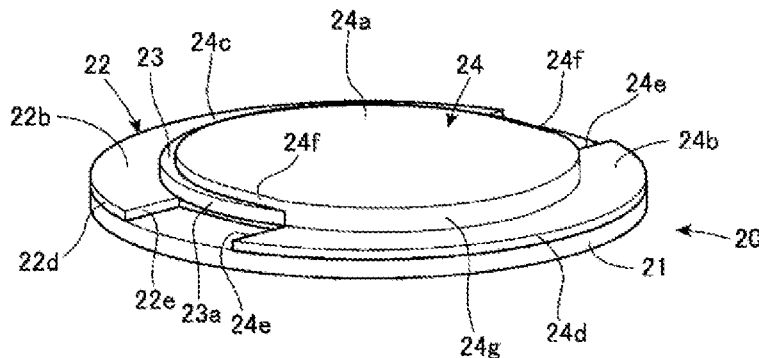
FIG. 6 is a perspective view of a laminated state of an electrochromic laminate.

In the production of the electrochromic element 19, an electrochromic laminate 20 serving as the base of the electrochromic element 19 is formed. Then, a portion of the electrochromic laminate 20 is cut into an arbitrary shape corresponding to the lens 30 of each of the light-modulating lenses 11 and 12 to obtain the electrochromic element 19 for the light-modulating lenses 11 and 12. FIGS. 2, 3 and 6 show the state in which each layer constituting the electrochromic laminate 20 is laminated, and FIGS. 4 and 5 show each layer of the electrochromic laminate 20 separately.

The electrochromic laminate 20 is configured by laminating a first electrode layer 22, an electrochromic layer (light-modulating layer) 23, and a second electrode layer 24 on a substrate 21 made of a synthetic resin. The materials and roles of each layer constituting the electrochromic laminate 20 are based on existing electrochromic elements, and will be briefly described.

Each of the first electrode layer 22 and the second electrode layer 24 is a transparent conductive film made of a transparent and conductive material. For example, as the material of the first electrode layer 22 and the second electrode layer 24, indium tin oxide (ITO) obtained by adding tin oxide (Sn2O2) to indium oxide (In2O3) is suitable, but other materials may be used. The thicknesses of the first electrode layer 22 and the second electrode layer 24 are set to predetermined values that provide the electrical resistance value required for an oxidation-reduction reaction in the electrochromic layer 23.

The electrochromic layer 23 is a three-layer film consisting of an electrochromic electrode layer, a solid electrolyte layer, and a counter electrode layer. For example, a tungsten oxide (WO3) film is suitable as the electrochromic electrode layer, a tantalum pentoxide (Ta2O5) film is suitable as the solid electrolyte layer, and an iridium oxide (Ir2O2) or indium oxide (In2O3) film is suitable as the counter electrode layer, but other materials may be used.

The methods for forming the first electrode layer 22, the second electrode layer 24, and the electrochromic layer 23 can be arbitrarily selected from well-known deposition methods (various coating deposition methods, vacuum deposition methods, and the like) depending on the materials and purposes.

The substrate 21 in the electrochromic laminate 20 has a substantially circular shape centered on a deposition center C shown in FIG. 2. The electrochromic layer 23 has a substantially circular shape centered on the deposition center C, and an annular outer peripheral portion 23a surrounding the deposition center C in a front view as shown in FIGS. 2 and 4 forms the outer shape. The diameter D2 (FIG. 4) of the electrochromic layer 23 is smaller than the diameter D1 (FIG. 4) of the substrate 21. A portion of the electrochromic layer 23 near the outer edge serves as an extension portion 23b that extends in the thickness direction of the electrochromic laminate 20 and contacts the substrate 21.

The first electrode layer 22 and the second electrode layer 24 are symmetrical to each other with respect to a center line passing through the deposition center C and extending in the Y-axis direction in the front view (FIGS. 2 and 4) of the electrochromic laminate 20. That is, the first electrode layer 22 and the second electrode layer 24 have a bilaterally symmetrical shape with respect to the deposition center C in a front view. Specifically, the first electrode layer 22 and the second electrode layer 24 each have the shape described below.

As shown in FIG. 4, the first electrode layer 22 has a central circular portion 22a and an outer-diameter portion 22b arranged radially outside the central circular portion 22a. The central circular portion 22a is a substantially circular portion centered on the deposition center C, and the diameter D3 (FIG. 4) of the central circular portion 22a is set slightly smaller than the diameter D2 (FIG. 4) of the electrochromic layer 23.

The outer-diameter portion 22b is a portion of a circular shape having a larger diameter than the central circular portion 22a, and more specifically, is a portion of a circular shape having the same outer peripheral shape (radius size) as the substrate 21. The outer-diameter portion 22b is formed in a portion biased to the left side of the deposition center C in the X-axis direction in a front view of the electrochromic laminate 20.

The outer shape of the first electrode layer 22 is constituted by a semicircular outer peripheral portion 22c of the central circular portion 22a, an circular arc portion 22d of the outer-diameter portion 22b, a pair of linear portions 22e extending in the Y-axis direction from both ends of the circular arc portion 22d, and a pair of linear portions 22f extending in the X-axis direction from the pair of linear portions 22e and connected to the semicircular outer peripheral portion 22c. The circular arc portion 22d has a shape that substantially matches a portion of the outer peripheral shape of the substrate 21.

As shown in FIG. 4, the second electrode layer 24 has a central circular portion 24a and an outer-diameter portion 24b arranged radially outside the central circular portion 24a. The central circular portion 24a is a portion of a substantially circular shape centered on the deposition center C, and the diameter D4 (FIG. 4) of the central circular portion 24a is set slightly smaller than the diameter D2 (FIG. 4) of the electrochromic layer 23. The diameter D3 of the central circular portion 22a of the first electrode layer 22 and the diameter D4 of the central circular portion 24a of the second electrode layer 24 are equal.

The outer-diameter portion 24b is a portion of a circular shape having a larger diameter than the central circular portion 24a, and more specifically, is a portion of a circular shape having the same outer peripheral shape (radius size) as the substrate 21. The outer-diameter portion 24b is formed in a portion biased to the right side of the deposition center C in the X-axis direction in a front view of the electrochromic laminate 20. As shown in FIG. 5, the central circular portion 24a and the outer-diameter portion 24b are positioned at different positions in the thickness direction of the electrochromic laminate 20, and the outer edge portion of the central circular portion 24a and the inner edge portion of the outer-diameter portion 24b are connected by a connection portion 24g.

The outer shape of the second electrode layer 24 in a front view is constituted by a semicircular outer peripheral portion 24c of the central circular portion 24a, an circular arc portion 24d of the outer-diameter portion 24b, a pair of linear portions 24e extending from both ends of the circular arc portion 24d in the Y-axis direction, and a pair of linear portions 24f extending in the X-axis direction from the pair of linear portions 24e and connected to the semicircular outer peripheral portion 24c. The circular arc portion 24d has a shape that substantially matches a portion of the outer peripheral shape of the substrate 21. Since there is a step due to the connection portion 24g between the central circular portion 24a and the outer-diameter portion 24b, the pair of linear portions 24e and the pair of linear portions 24f are not directly connected (see FIG. 5).

The centers of the central circular portions 22a and 24a of the first electrode layer 22 and the second electrode layer 24 are positioned at the deposition center C, and the outer-diameter portion 22b and the outer-diameter portion 24b are formed and arranged bilaterally symmetrical with respect to the deposition center C in a front view. As shown in FIG. 3, both the central circular portion 22a and the outer-diameter portion 22b of the first electrode layer 22 are in contact with the substrate 21, and the outer-diameter portion 24b of the second electrode layer 24 is in contact with the substrate 21.

A region in which the first electrode layer 22 (central circular portion 22a), the electrochromic layer 23, and the second electrode layer 24 (central circular portion 24a) all overlap each other in the thickness direction of the electrochromic laminate 20 is a light-modulating region E (FIGS. 2 and 3) in which the change in color (change in transmittance) occurs due to application of a voltage. In a front view of the electrochromic laminate 20, a circular region surrounded by the semicircular outer peripheral portion 22c of the central circular portion 22a and the semicircular outer peripheral portion 24c of the central circular portion 24a is the light-modulating region E (see FIG. 2).

Outside the light-modulating region E, the outer-diameter portion 22b of the first electrode layer 22 and the outer-diameter portion 24b of the second electrode layer 24 are separated from each other in the X-axis direction without overlapping each other. In a front view of the electrochromic laminate 20, there is a gap in the X-axis direction between the pair of linear portions 22e of the outer-diameter portion 22b and the pair of linear portions 24e of the outer-diameter portion 24b. As shown in FIG. 6, the outer-diameter portion 22b and the outer-diameter portion 24b are also positioned at different positions in the thickness direction of the electrochromic laminate 20.

The dimensions (in particular, diameters D1 to D4) of each part of the electrochromic laminate 20 are set so that the outer shapes of the lenses 30 of the light-modulating lenses 11 and 12 of a plurality of types (different shapes and sizes) expected to be used in the electronic light-modulating glasses 10 are set to fit inside the outer peripheral portion 23a of the electrochromic layer 23. As an example, the diameter D1 of the substrate 21 is 40 mm, the diameter D2 of the electrochromic layer 23 is 30 mm, the diameter D3 of the central circular portion 22a and the diameter D4 of the central circular portion 24a are each 28 mm. In this case, a circular region with a diameter of 28 mm centered on the deposition center C becomes the light-modulating region E.

The diameter D2 of the electrochromic layer 23 is made larger than the diameters D3 and D4 of the central circular portion 22a and the central circular portion 24a, respectively, to provide a margin of about 1 mm in the radial direction about the deposition center C. The outer-diameter portion 22b and the outer-diameter portion 24b are spaced apart in the X-axis direction. As a result, there is no portion where the first electrode layer 22 and the second electrode layer 24 directly face each other in the thickness direction of the electrochromic laminate 20, and short-circuiting between the first electrode layer 22 and the second electrode layer 24 is prevented.

The electrochromic element 19 customized for the lenses is obtained by cutting the electrochromic laminate 20 having the above-described structure into the shapes corresponding to the outer shapes of the light-modulating lenses 11 and 12. As a setting condition for obtaining the electrochromic element 19 from the electrochromic laminate 20, first, an overlapping region V (FIG. 2) having a shape that overlaps the outer shape of the lens 30 is set in the formation region (inside the outer peripheral portion 23a) of the electrochromic layer 23 in a front view. Two or more terminal regions T1 and T2 (FIG. 2) which are continuous with the outer side of the overlapping region V and in which the first electrode layer 22 (outer-diameter portion 22b) and the second electrode layer 24 (outer-diameter portion 24b) are independently present without overlapping each other. The electrochromic element 19 is obtained by cutting a portion where the overlapping region V and the terminal regions T1 and T2 are combined from the electrochromic laminate 20.

More specifically, as shown in FIG. 2, the arrangement of the overlapping region V is set so that the outer shape of the lens 30 in the light-modulating lenses 11 and 12 inscribes the substantially circular outer peripheral portion 23a of the electrochromic layer 23 at two locations (inscribed points P1 and P2).

One inscribed point P1 is located in the formation range (inner diameter side of the circular arc portion 22d) of the outer-diameter portion 22b of the first electrode layer 22 in the circumferential direction around the deposition center C, and the other inscribed point P2 is located in the formation range (inner diameter side of the circular arc portion 24d) of the outer-diameter portion 24b of the second electrode layer 24 in the circumferential direction around the deposition center C.

Since the respective formation ranges of the outer-diameter portion 22b and the outer-diameter portion 24b are divided into one and the other in the X-axis direction with respect to the deposition center C, the positions of the inscribed point P1 and the inscribed point P2 are different at least in the X-axis direction. In the setting shown in FIG. 2, the inscribed point P1 and the inscribed point P2 are at substantially the same position in the Y-axis direction. The position of the inscribed point P1 and the position of the inscribed point P2 may differ from each other in the Y-axis direction depending on the outer shape of the lens 30 and the arrangement of the overlapping region V.

A portion of the outer-diameter portion 22b outside the inscribed point P1 is set as the terminal region T1 continuous with the overlapping region V, and a portion of the outer-diameter portion 24b outside the inscribed point P2 is set as the terminal region T2 continuous with the overlapping region V. In the second electrode layer 24, a connection portion 24g is present at the boundary between the central circular portion 24a and the outer-diameter portion 24b. Therefore, as for the terminal region T2, a condition may be added that the terminal region T2 is extended toward the outer diameter side from the inscribed point P2 to a position exceeding at least the thickness of the connection portion 24g in a front view. By setting in this way, the terminal region T2 can be reliably positioned on the outer-diameter portion 24b.

By setting the overlapping region V and the terminal regions T1 and T2 in this way and cutting them out from the electrochromic laminate 20, the electrochromic element 19 which has the light-modulating effect over substantially the entire area of the lens 30 and includes a plurality of terminal portions (the terminal regions T1 and T2) for power supply can be produced in a simple manner.

As an advantage of the manufacturing method described above, the electrochromic element 19 that can be applied to any shape of the lens 30 can be obtained from one type of electrochromic laminate 20 as long as the above-mentioned setting conditions regarding the arrangement of the overlapping region V and the terminal regions T1 and T2 are satisfied. Therefore, the electrochromic element 19 with the electrode arrangement customized for each lens can be produced with less labor and at a lower cost without performing deposition processing using individual mask patterns corresponding to a plurality of types of lens shapes.

The electrochromic layer 23 in the electrochromic laminate 20 has an extremely simple circular shape in a front view. Moreover, the first electrode layer 22 and the second electrode layer 24 each have a relatively simple shape obtained by removing a portion from the circular shape of the substrate 21 in a front view. Therefore, each layer of the electrochromic laminate 20 can be easily formed without using complicated mask patterns. The electrochromic laminate 20 can be efficiently produced at a low cost compared to the deposition processing using a complicated mask pattern that matches the shape of each individual lens.

The terminal regions T1 and T2 of the electrochromic element 19 are in conductive contact with conductive portions disposed inside the frame 13 when the light-modulating lenses 11 and 12 are assembled in the frame 13. Contact points between the terminal regions T1 and T2 and the conductive portions are covered with the rims 14 and 15 of the frame 13 and are not exposed to the outside of the electronic light-modulating glasses 10 (see FIG. 1).

In the example shown in FIG. 2, a portion of the overlapping region V near the terminal regions T1 and T2 (inscribed points P1 and P2) is not included in the light-modulating region E. However, since the portion is covered by the rims 14 and 15 when the light-modulating lenses 11 and 12 are assembled into the frame 13, in the completed state of the electronic light-modulating glasses 10, the light-modulating effect of the light-modulating lenses 11 and 12 can be obtained over the entire area inside the rims 14 and 15.

The electrochromic element 19 after being cut out from the electrochromic laminate 20 may be processed to seal the peripheral portion with a sealing material or the like. In this way, the durability of the electrochromic element 19 can be improved.

As shown in FIG. 2, in the electrochromic laminate 20 of the present embodiment, the first electrode layer 22 and the second electrode layer 24 cover most of the substrate 21 except for the space between the linear portion 22e and the linear portion 24e. In this way, by forming the first electrode layer 22 (especially the outer-diameter portion 22b) and the second electrode layer 24 (especially the outer-diameter portion 24b) in a shape that covers the outer edge shape of the substrate 21 as much as possible, the range that can be selected for the overlapping region V and the terminal regions T1 and T2 is widened, and the variations of compatible lens shapes are widened.

When the first electrode layer 22 (especially the outer-diameter portion 22b) and the second electrode layer 24 (especially the outer-diameter portion 24b) are formed so as to cover the outer edge shape of the substrate 21 as much as possible, the degree of freedom in selecting the arrangement of the overlapping region V and the terminal regions T1 and T2 is increased for the same lens shape. For example, in the electrochromic laminate 20 of the present embodiment, even if the overlapping region V is tilted to some extent from the arrangement shown in FIG. 2, it is possible to satisfy the setting condition that the outer shape of the lens 30 inscribes the outer peripheral portion 23a of the electrochromic layer 23 at two locations and the terminal regions T1 and T2 are arranged in the outer-diameter portions 22b and 24b. Therefore, when a deposition defect occurs in a portion of the electrochromic laminate 20, there is more room for setting the overlapping region V and the terminal regions T1 and T2 while avoiding the defective portion. Thus, the yield in the production of the electrochromic element 19 can be improved.

However, if the formation range of the first electrode layer 22 and the second electrode layer 24 on the substrate 21 is too wide, the risk of contactor short-circuiting between the electrode layers 22 and 24 increases. Therefore, in the first electrode layer 22 and the second electrode layer 24, the outer-diameter portions 22b and 24b outside the central circular portions 22a and 24a are arranged so as not to overlap each other in a front view. In the electrochromic laminate 20 of the present embodiment, the linear portion 22e, which is the edge portion of the outer-diameter portion 22b, and the linear portion 24e, which is the edge portion of the outer-diameter portion 24b, are configured to have a gap in the X-axis direction so that they are separated by a predetermined distance or more.

In the frame 13 of the electronic light-modulating glasses 10 shown in FIG. 1, the temples 16 and 17 and the bridge 18 are connected to the upper edge sides of left and right rims 14 and 15. Therefore, a structure that facilitates arranging the conductive portions for supplying power to the electrochromic elements 19 of the left and right light-modulating lenses 11 and 12 along the upper edge side of the frame 13 is obtained. In other words, it is assumed that a conductive portion extending substantially in the X-axis direction along the upper edge side of the frame 13 is employed. In this case, as shown in FIGS. 1 and 2, as the terminal arrangement on the side of the electrochromic element 19 in which the terminals are easily connected to the conductive portion, it is suitable to provide the terminal regions T1 and T2 so as to be distributed to both sides in the X-axis direction near the upper edges of the light-modulating lenses 11 and 12 (overlapping region V). For this reason, in the electrochromic laminate 20, the outer-diameter portions 22b and 24b, which are the bases of the terminal regions T1 and T2, are distributed to both sides in the X-axis direction.

However, it is also possible to make the arrangement of the outer-diameter portions of the two electrode layers different from the above-described embodiment. For example, a structure in which the electrochromic laminate 20 shown in FIG. 2 is rotated by 90 degrees so that the outer-diameter portions 22b and 24b are spaced apart in the Y-axis direction may be employed. In this case, the angle and the position of the overlapping region are changed so that the two inscribed points where the outer shape of the lens 30 inscribes the outer peripheral portion 23a of the electrochromic layer 23 are distributed to the upper side and the lower side in the Y-axis direction with the deposition center C disposed therebetween. Correspondingly, the two terminal regions provided outside the two inscribed points are also arranged so as to be distributed to the upper side and the lower side in the Y-axis direction.

Although one type of electrochromic laminate 20 has been described above, a plurality of types of electrochromic laminates in which the light-modulating regions E have different diameters may be prepared. In this way, it is possible to produce electrochromic elements that are compatible with lenses of a wide variety of shapes and sizes. The diameter of the light-modulating region E can be appropriately set by the respective diameters D2 to D4 of the electrochromic layer 23, the central circular portion 22a of the first electrode layer 22, and the central circular portion 24a of the second electrode layer 24. This is a minor change involving a change in the diameter of a circular portion. Therefore, even if a plurality of types of electrochromic laminates are prepared, labor and costs can be kept low compared to the case of changing to different deposition patterns for each lens shape.

Note that when the manufacturing method of the present embodiment is applied, the center of the lens may be decentered from the deposition center C of the electrochromic laminate 20, but this can be handled by optically designing the lens in consideration of the decentration. Such handling can also be realized by processing the back surface (concave surface), which is performed when the lens 30 shown in FIG. 1 is finished to the final shape, for example.

Figure 7:
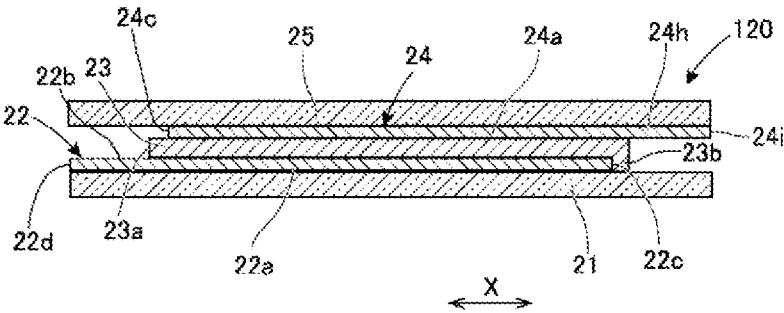
FIG. 7 is a cross-sectional view showing a modified electrochromic laminate.

FIG. 7 shows an electrochromic laminate 120 according to a modified example. The electrochromic laminate 20 described above is formed by laminating the first electrode layer 22, the electrochromic layer 23, and the second electrode layer 24 on one substrate 21 (see FIG. 3). On the other hand, the electrochromic laminate 120 of FIG. 7 has a substrate 25 made of a synthetic resin in addition to the substrate 21, and has a structure in which the first electrode layer 22, the electrochromic layer 23, and the second electrode layer 24 are sandwiched between the substrate 21 and the substrate 25.

The substrate 25 has a substantially circular shape centered on the deposition center C shown in FIG. 2 and has substantially the same diameter as the substrate 21. The first electrode layer 22 is formed on the substrate 21, the second electrode layer 24 is formed on the substrate 25, and the electrochromic layer 23 is disposed between the first electrode layer 22 and the second electrode layer 24 facing each other to obtain the electrochromic laminate 120.

The positions of the substrates 21 and 25 are determined such that their centers (deposition centers C) coincide with each other. The shape and arrangement of the first electrode layer 22 on the substrate 21 are set similarly to the electrochromic laminate 20. Regarding the second electrode layer 24, the outer-diameter portion 24h outside the central circular portion 24a is at the same position as the central circular portion 24a in the thickness direction of the electrochromic laminate 120, and the central circular portion 24a and the outer-diameter portion 24h are both in contact with the substrate 25. In other words, unlike the electrochromic laminate 20 of the above-described embodiment, the second electrode layer 24 of the electrochromic laminate 120 has a flat configuration in which the central circular portion 24a and the outer-diameter portion 24h are continuous without a connection portion. A circular arc portion 24i, which is the outer edge of the outer-diameter portion 24h, has a shape that substantially matches a portion of the outer peripheral shape of the substrate 25. The shapes and positional relationship of the first electrode layer 22, the electrochromic layer 23, and the second electrode layer 24 in a front view of the electrochromic laminate 120 are the same as those of the electrochromic laminate 20 described above. Therefore, the manufacturing method using the electrochromic laminate 120 can obtain the same effect as the manufacturing method using the electrochromic laminate 20.

The outer-diameter portion 22b of the first electrode layer 22 and the outer-diameter portion 24b of the second electrode layer 24 shown in FIGS. 2 and 4 have shapes that are optimized to largely cover the outer edge shape of the substrate 21. However, the shapes of the outer-diameter portions of the electrode layers 22 and 24 may be changed.

In the first electrode layer 22 and the second electrode layer 24 shown in FIGS. 2 and 4, although the outer-diameter portion 22b and the outer-diameter portion 24b are symmetrical with respect to the deposition center C in a front view, the shapes of the outer-diameter portions of the electrode layers 22 and 24 may be asymmetric in a front view.

Figure 8:
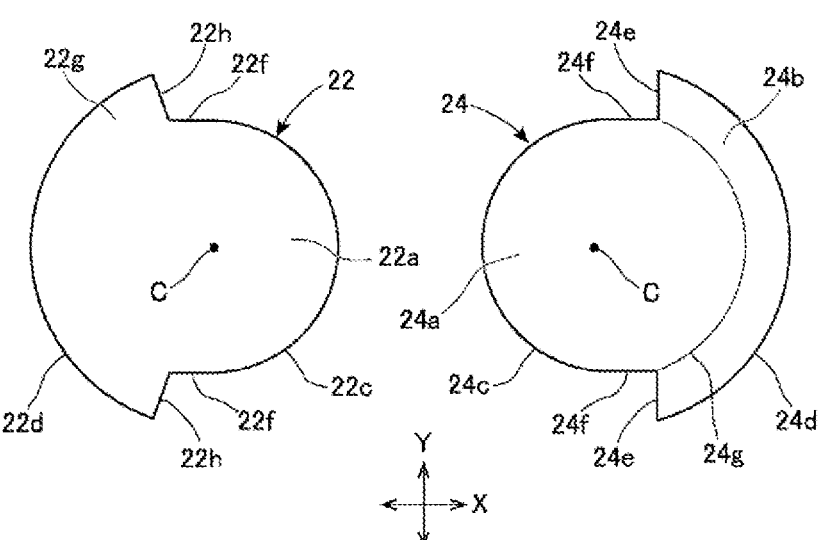
FIG. 8 is a front view showing an electrode layer of a modified example.

FIG. 8 shows a modified example of the first electrode layer 22 having an outer-diameter portion 22g whose shape is changed. An edge portion of the outer-diameter portion 22g of this modified example is a linear portion 22h extending radially from the deposition center C instead of the linear portion 22e (see FIG. 4) described above. That is, the outer-diameter portion 22g has a fan shape centered on the deposition center C. The outer-diameter portion 24b of the second electrode layer 24 in FIG. 8 has the same shape as in FIG. 4. Therefore, the outer-diameter portion 22g of the first electrode layer 22 and the outer-diameter portion 24b of the second electrode layer 24 have shapes that are bilaterally asymmetric with respect to the deposition center C in a front view. The outer-diameter portion 22g and the outer-diameter portion 24b having such an asymmetrical shape may satisfy the condition that the terminal regions T1 and T2 (FIG. 2) can be set without overlapping each other.

As another modified example of FIG. 8, the outer-diameter portion of the second electrode layer 24 may be formed into a fan shape similar to the outer-diameter portion 22g of the first electrode layer 22, and the outer diameters of the electrode layers 22 and 24 may be configured to be bilaterally symmetrical with respect to the deposition center C.

The shapes of the outer-diameter portion of the first electrode layer 22 and the outer-diameter portion of the second electrode layer 24 may be changed to a shape other than the fan shape as shown in FIG. 8.

Although the present invention has been described based on the illustrated embodiments, the present invention is not limited to the above-described embodiments, and various modifications and changes can be made without departing from the scope of the invention.

The dimensions of the substrate 21, the first electrode layer 22, the electrochromic layer 23, the second electrode layer 24, and the substrate 25 described above are examples, and may be changed to different sizes.

In the electrochromic laminates 20 and 120 of the above-described embodiments, the light-modulating region E and the electrochromic layer 23 are circular. This shape is excellent in terms of high versatility in that it can be easily compatible with various lens shapes without being biased in a specific direction. However, if there is a shape feature common to the assumed lens shape to some extent, the light-modulating region and the electrochromic layer may be set in a non-circular (for example, elliptical) shape that reflects the shape feature.

The light-modulating lenses 11 and 12 of the above-described embodiments have a structure in which the electrochromic element 19 is superimposed on the surface (convex surface) of the lens 30. Alternatively, the light-modulating lens may have a structure in which an electrochromic element is arranged (sandwiched) inside the lens in the thickness direction.

Each part constituting the electrochromic element 19 (electrochromic laminates 20 and 120) may be made of materials other than those described above. For example, the substrate may be made of glass instead of a synthetic resin. The electrochromic material may be an organic material instead of the inorganic material described above.

In the above-described embodiment, the electrochromic element 19 is applied as the electronic element that constitutes the light-modulating lenses 11 and 12, but the electrochromic element 19 may be applied to electronic elements other than the electrochromic element. For example, liquid crystal elements and electrophoresis elements are common to electrochromic elements in that optical properties are changed when electrical energy is supplied. Therefore, even in an electronic light-modulating device using a liquid crystal element or an electrophoresis element as an electronic element, the same effect can be obtained by applying the above-described technique in the manufacture of the electronic element including electrodes. In the present invention, the term "light modulation" refers to the overall optical effects of such various electronic elements on optical elements, and is not limited to optical transparency (light transmittance) in a narrow sense and changes in color. For example, information display (superimpose) using a liquid crystal element in an optical apparatus is also a form of light modulation.

The electronic light-modulating glasses 10 of the above-described embodiment have a high degree of freedom in selecting the shapes of the light-modulating lenses 11 and 12, and thus, the usefulness of the present invention is particularly high. However, the present invention can also be applied to electronic light-modulating devices other than electronic light-modulating glasses. For example, the present invention can be applied to electronic light-modulating glass for windows (electronic blinds), privacy filters for displays of portable electronic devices, and the like. In this case, a window glass, a cover glass of a display, or the like is the optical element in the present invention.

INDUSTRIAL APPLICABILITY

By applying the present invention, it is possible to efficiently manufacture light-modulating electronic elements of various shapes, and it is possible to improve the productivity and reduce the manufacturing cost of electronic light-modulating devices such as electronic light-modulating glasses.

The invention claimed is:

1. A method for manufacturing an electronic light-modulating device that obtains a light-modulating effect by supplying electrical energy to an electronic element overlapping an optical element, the method comprising:

forming a laminate in which a pair of electrode layers and a light-modulating layer between the pair of electrode layers are laminated; and setting, in the laminate, an overlapping region having a shape overlapping the optical element in a formation region of the light-modulating layer, setting two or more terminal regions which are continuous to an outer side of the overlapping region and in which one and the other of the pair of electrode layers are independently present, and cutting a portion including the overlapping region and the terminal regions from the laminate to form the electronic element, wherein the light-modulating layer in the laminate is substantially circular, each of the pair of electrode layers in the laminate bas a circular portion, which is substantially circular, that overlaps the light-modulating layer, and an outer-diameter portion that is arranged radially outside the circular portion, the laminate is formed in such a manner that the outer-diameter portions of the pair of electrode layers do not overlap each other in a front view, the overlapping region is set so that an outer shape of the optical element inscribes a substantially circular outer peripheral shape of the light-modulating layer at two locations, and the terminal region is set so that the outer-diameter portions of one and the other of the pair of electrode layers are located on an outer side of the two inscribed locations.

2. The method for manufacturing the electronic light-modulating device according to claim 1, wherein the circular portion of each of the pair of electrode layers in the laminate has a smaller diameter than the light-modulating layer.

3. The method for manufacturing the electronic light-modulating device according to claim 1, wherein each of the outer-diameter portions of the pair of electrode layers in the laminate is a portion of a circular shape having a larger diameter than the circular portion, and the outer-diameter portion of one electrode layer and the outer-diameter portion of the other electrode layer are arranged symmetrically with respect to a center of the circular portion in a front view.

4. The method for manufacturing the electronic light-modulating device according to claim 1, wherein the electronic element is an electrochromic element that causes a reversible change in optical properties due to an oxidation-reduction reaction in the light-modulating layer when a voltage is applied to the electrode layer.

5. The method for manufacturing the electronic light-modulating device according to claim 1, wherein the electronic light-modulating device is electronic light-modulating glasses in which the electronic element is arranged on or inside a lens which is the optical element.

6. A light-modulating electronic element that is arranged to overlap an optical element and obtains a light-modulating effect with supply of electrical energy, the light-modulating electronic element comprising:

a laminate in which a pair of electrode layers and a light-modulating layer between the pair of electrode layers are laminated, wherein the laminate includes:

an overlapping region, which is a region positioned within a formation region of the light-modulating layer and overlapping the optical element in a front view; and two or more terminal regions which are continuous to an outer side of the overlapping region and in which one and the other of the pair of electrode layers are independently present, the laminate has a shape in which the overlapping region and the terminal region can be set for a plurality of optical elements having different shapes, the light-modulating layer in the laminate has a substantially circular shape in which an outer shape of the optical element inscribes an outer periphery at two locations, each of the pair of electrode layers in the laminate has a circular portion, which is substantially circular, that overlaps the light-modulating layer, and an outer-diameter portion that is arranged radially outside the circular portion, the outer-diameter portions of the pair of electrode layers do not overlap each other in a front view, and the terminal region is positioned on the pair of electrode layers outside the two locations where the outer shape of the optical element inscribes the outer periphery of the light-modulating layer.

7. The light-modulating electronic element according to claim 6, wherein the circular portion of each of the pair of electrode layers in the laminate has a smaller diameter than the light-modulating layer.

8. The light-modulating electronic element according to claim 6, wherein each of the outer-diameter portions of the pair of electrode layers in the laminate is a portion of a circular shape having a larger diameter than the circular portion, and the outer-diameter portion of one electrode layer and the outer-diameter portion of the other electrode layer are arranged symmetrically with respect to a center of the circular portion in a front view.

9. The light-modulating electronic element according to claim 6, wherein the electronic element is an electrochromic element that causes a reversible change in optical properties due to an oxidation-reduction reaction in the light-modulating layer when a voltage is applied to the electrode layer.

10. Electronic light-modulating glasses comprising the light-modulating electronic element according to claim 6, wherein the optical element is a lens, the light-modulating electronic element includes the overlapping region having a shape corresponding to the lens, and two or more terminal regions outside the overlapping region, and the electronic light-modulating glasses include a light-modulating lens in which the light-modulating electronic element is located on or inside the lens and a frame holding the light-modulating lens.

* * * * *